(12) United States Patent
Ellingsrud et al.

(10) Patent No.: US 6,717,411 B2
(45) Date of Patent: Apr. 6, 2004

(54) ELECTROMAGNETIC METHOD AND APPARATUS FOR DETERMINING THE NATURE OF SUBTERRANEAN RESERVOIRS USING REFRACTED ELECTROMAGNETIC WAVES

(75) Inventors: Svein Ellingsrud, Trondheim (NO); Terje Eidesmo, Ranheim (NO); Harald Westerdahl, Dal (NO); Fan-Nian Kong, Oslo (NO)

(73) Assignee: Statoil ASA, Stavanger (NO)

( * ) Notice: Subject to any disclaimer, the term of this patent is extended or adjusted under 35 U.S.C. 154(b) by 0 days.

(21) Appl. No.: 10/214,471

(22) Filed: Aug. 7, 2002

(65) Prior Publication Data

US 2003/0052685 A1 Mar. 20, 2003

(51) Int. Cl.[7] .................................................. G01V 3/08
(52) U.S. Cl. ........................................ 324/337; 324/334
(58) Field of Search ................................ 324/338, 337, 324/324, 339, 340, 341, 342, 334, 335, 336; 702/7; 73/152.02, 152.03

(56) References Cited

U.S. PATENT DOCUMENTS

| 2,077,707 A | | 4/1937 | Melton .......................... 175/182 |
| 2,531,088 A | | 11/1950 | Thompson ..................... 175/182 |
| 3,052,836 A | | 9/1962 | Postma ............................. 324/1 |
| 3,806,795 A | | 4/1974 | Morey ............................. 324/6 |
| 4,010,413 A | * | 3/1977 | Daniel ............................. 324/6 |
| 4,047,098 A | | 9/1977 | Duroux ............................ 324/6 |
| 4,079,309 A | | 3/1978 | Seeley | |
| 4,258,321 A | * | 3/1981 | Neale, Jr. ...................... 324/334 |
| 4,258,322 A | | 3/1981 | Rocroi et al. .................. 324/335 |
| 4,308,499 A | | 12/1981 | Thierbach et al. .............. 324/337 |
| 4,417,210 A | | 11/1983 | Rocroi et al. .................. 324/336 |
| 4,446,434 A | | 5/1984 | Sternberg et al. .............. 324/363 |
| 4,451,789 A | | 5/1984 | Meador ........................ 324/338 |
| 4,506,225 A | | 3/1985 | Loveless et al. ............... 324/334 |
| 4,547,733 A | | 10/1985 | Thoraval ....................... 324/338 |
| 4,594,551 A | | 6/1986 | Cox et al. ..................... 324/341 |
| 4,616,184 A | | 10/1986 | Lee et al. ..................... 324/335 |
| 4,617,518 A | | 10/1986 | Srnka .......................... 324/365 |
| 4,633,182 A | | 12/1986 | Dzwinel ....................... 324/335 |
| 4,652,829 A | | 3/1987 | Safinya ........................ 324/338 |
| 4,760,340 A | | 7/1988 | Denzau et al. ................. 324/348 |
| 4,835,474 A | | 5/1989 | Parra et al. .................. 324/363 |
| 5,025,218 A | | 6/1991 | Ramstedt ..................... 324/334 |
| 5,177,445 A | | 1/1993 | Cross .......................... 324/637 |
| 5,192,952 A | | 3/1993 | Johler .......................... 342/22 |
| 5,280,284 A | | 1/1994 | Johler .......................... 324/22 |
| 5,373,443 A | | 12/1994 | Lee et al. ..................... 364/420 |

(List continued on next page.)

FOREIGN PATENT DOCUMENTS

| EP | 0087271 | 8/1983 | |
| EP | 0219234 | 4/1987 | ............ G01V/3/24 |
| EP | 0512756 | 11/1991 | ............ G01V/11/00 |
| EP | 0814349 | 12/1997 | ............ G01V/3/30 |
| FR | 2479992 | 10/1981 | ............ G01V/3/12 |
| GB | 2155182 | 9/1985 | |
| GB | 2256715 | 12/1992 | |

(List continued on next page.)

OTHER PUBLICATIONS

Ellingsrud et al., "How Electromagnetic Sounding Technique Could be Coming to Hydrocarbon E & P", *First Break Article*, Mar. 1, 2002.

(List continued on next page.)

*Primary Examiner*—N. Le
*Assistant Examiner*—Subhash Zaveri
(74) *Attorney, Agent, or Firm*—Patterson, Thuente, Skaar & Christensen, P.A.

(57) ABSTRACT

A method for investigating subterranean strata. An electromagnetic field is applied using a dipole antenna transmitter and this is detected using a dipole antenna receiver. Phase information is extracted from a refracted wave response and used to identify the presence and/or nature of a subterranean reservoir.

29 Claims, 3 Drawing Sheets

U.S. PATENT DOCUMENTS

| | | | |
|---|---|---|---|
| 5,400,030 A | 3/1995 | Duren et al. | 342/22 |
| H1490 H | 9/1995 | Thompson et al. | 367/15 |
| 5,486,764 A | 1/1996 | Thompson et al. | 324/323 |
| H1524 H | 4/1996 | Thompson et al. | 324/334 |
| H1561 H | 7/1996 | Thompson | 367/188 |
| 5,563,513 A | 10/1996 | Tasei et al. | 324/359 |
| 5,689,068 A | 11/1997 | Locatelli et al. | 73/152.02 |
| 5,767,679 A | 6/1998 | Schroder | 324/337 |
| 5,811,973 A | 9/1998 | Meyer, Jr. | 324/338 |
| 5,841,280 A | 11/1998 | Yu et al. | 324/323 |
| 5,877,995 A | 3/1999 | Thompson et al. | 367/14 |
| 5,886,526 A | 3/1999 | Wu | 324/338 |
| 5,892,361 A | 4/1999 | Meyer, Jr. et al. | 324/338 |
| 5,955,884 A | 9/1999 | Payton et al. | 324/339 |
| 6,002,357 A | 12/1999 | Redfern et al. | 342/22 |
| 6,023,168 A | 2/2000 | Minerbo | 324/373 |
| 6,060,885 A | 5/2000 | Tabarovsky et al. | 324/266 |
| 6,157,195 A | 12/2000 | Vail, III | 324/368 |
| 6,163,155 A | 12/2000 | Bittar | 324/338 |
| 6,181,138 B1 * | 1/2001 | Hagiwara et al. | 324/338 |
| 6,184,685 B1 | 2/2001 | Paulk et al. | 324/338 |
| 6,188,221 B1 | 2/2001 | Van de Kop et al. | 324/337 |
| 6,188,222 B1 | 2/2001 | Seydoux et al. | 324/339 |
| 6,225,806 B1 | 5/2001 | Millar et al. | 324/353 |
| 6,246,240 B1 | 6/2001 | Vail, III | 324/368 |
| 6,339,333 B1 | 1/2002 | Kuo | 324/337 |

FOREIGN PATENT DOCUMENTS

| | | | |
|---|---|---|---|
| GB | 2301902 | 12/1996 | G01V/3/30 |
| WO | 81/01617 | 6/1981 | |
| WO | WO 96/06367 | 2/1996 | G01V/3/12 |
| WO | WO 98/28638 | 7/1998 | |
| WO | WO 00/00850 | 1/2000 | G01V/3/30 |
| WO | WO 00/13037 | 3/2000 | G01V/3/12 |
| WO | WO 00/13046 | 3/2000 | G01V/3/12 |
| WO | WO 00/63718 | 10/2000 | G01S/5/06 |
| WO | 01/55749 | 8/2001 | |

OTHER PUBLICATIONS

Eidesmo et al., "Sea Bed Logging (SBL), a new method for remote and direct identification of hydrocarbon filled layers in deepwater areas", *First Break Research Findings*, Mar. 1, 2002.

"EM Field of an Electric Dipole on the Surface of a Medium Containing a Thin Resistant Layer", *EM Field of An Electric Dipole*, Mar. 2002.

Kaufman et al., 1981 Annual Meeting Abstracts: Marine EM Prospecting System, Annual Meeting Abstracts, Mar. 1981.

Garg et al., "Synthetic Electric Sounding Surveys Over Known Oil Fields", *Synthetic Electric Sounding Surveys*, Nov. 1, 1984.

Yuan et al., "The Assessment of Marine Gas Hydrates Through Electrical Remote Sounding: Hydrate Without a BSR!", *Assessment of Marine Gas Hydrates*, Aug. 15, 2000.

Edwards, "On the Resource Evalution of Marine Gas Hydrate Deposits Using Sea–Floor Transient Electric Dipole–Dipole Methods", *Resource Evaluation of Mature Gas Hydrate Deposits*, Jan. 1, 1997.

Chave, "Some Comments on Seabed Propagation of ULF/ELF Electromagnetic Fields", *Seabed Propagation of ULF/ELF EM Fields*, Sep. 1, 1990.

MacGregor et al., "Use of Marine Controlled–Source Electromagnetic Sounding for Sub–Basalt Exploration", *Use of Marine Controlled–Source EM Sounding*, Apr. 1, 2000.

MacGregor, "Marine Controlled Source Electromagnetic Sounding: Development of a Regularized Inversion for 2–dimensional Resistivity Structures", *Marine Controlled Source EM Sounding*, Apr. 1, 1999.

MacGregor et al., "The RAMESSES Experiment—III. Controlled–Source Electromagnetic Sounding of the Reykjanes Ridge", *RAMESSES Experiment*, Jul. 8, 1998.

Sinah et al., "Magmatic Processes at Slow Spreading Ridges: Implications of the RAMESSES Experiment at 57° 45'N on the Mid–Atlantic Ridge," *Magmatic Processes*, Jun. 23, 1998.

Sinah et al., "Evidence for Accumulated Melt Beneath the Slow–Speading Mid–Atlantic Ridge," *Evidence for Accumulated Melt*, Jan. 1, 1997.

\* cited by examiner

ELECTROMAGNETIC METHOD AND APPARATUS FOR DETERMINING THE NATURE OF SUBTERRANEAN RESERVOIRS USING REFRACTED ELECTROMAGNETIC WAVES

TECHNICAL FIELD

The present invention relates to a method and apparatus for determining the nature of submarine and subterranean reservoirs. The invention is particularly suitable for determining whether a reservoir, whose approximate geometry and location are known, contains hydrocarbons or water, and also for detecting reservoirs with particular characteristics.

BACKGROUND OF THE INVENTION

Currently, the most widely used techniques for geological surveying, particularly in sub-marine situations, are seismic methods. These seismic techniques are capable of revealing the structure of the subterranean strata with some accuracy. However, whereas a seismic survey can reveal the location and shape of a potential reservoir, it can normally not reveal the nature of the reservoir.

SUMMARY OF THE INVENTION

The solution therefore is to drill a borehole into the reservoir. However, the costs involved in drilling an exploration well tend to be in the region of £25 m and since the success rate is generally about 1 in 10, this tends to be a very costly exercise.

It is therefore an object of the invention to provide a system for locating a subterranean reservoir and for determining, its nature with greater certainty, without the need to sink a borehole.

It has been appreciated by the present applicants that while the seismic properties of hydrocarbon filled strata and water-filled strata do not differ significantly, their electromagnetic resistivities do differ. Thus, by using an electromagnetic surveying method, these differences can be exploited and the success rate in predicting the nature of a reservoir can be increased significantly. This represents potentially an enormous cost saving.

Consequently, a method and apparatus embodying these principles from the basis of the present applicant's co-pending British patent application No. 0002422.4, and co-pending U.S. application Ser. No. 10/123,867, incorporated herein by reference.

This contemplates a method of determining the nature of a subterranean reservoir whose approximate geometry and location are known, which comprises: applying a time varying electromagnetic field to the strata containing the reservoir; detecting the electromagnetic wave field response; seeking in the wave field response, a component representing a refracted wave from the hydrocarbon layer; and determining the content of the reservoir, based on the presence or absence of a wave component refracted by the hydrocarbon layer.

It also contemplates a method for searching for a hydrocarbon containing subterranean reservoir which comprises: applying a time varying electromagnetic field to subterranean strata; detecting the electromagnetic wave field response; seeking, in the wave field response, a component representing a refracted wave; and determining the presence and/or nature of any reservoir identified based on the presence or absence of a wave component refracted by hydrocarbon layer.

It further contemplates an apparatus for determining the nature of a subterranean reservoir whose approximate geometry and location are known, or for searching for a hydrocarbon containing subterranean reservoir, the apparatus comprising: means for applying a time varying electromagnetic field to the strata containing the reservoir; means for detecting the electromagnetic wave field response; and means for seeking, in the wave field response, a component representing a refracted wave, thereby enabling the presence and/or nature of a reservoir to be determined.

A refracted wave behaves differently, depending on the nature of the stratum in which it is propagated. In particular, the propagation losses in hydrocarbon stratum are much lower than in a water-bearing stratum while the speed of propagation is much higher. Thus, when an oil-bearing reservoir is present, and an EM field is applied, a strong and rapidly propagated refracted wave can be detected. This may therefore indicate the presence of the reservoir or its nature if its presence is already known.

Electromagnetic surveying techniques in themselves are known. However, they are not widely used in practice. In general, the reservoirs of interest are about 1 km or more below the seabed. In order to carry out electromagnetic surveying as a stand alone technique in these conditions, with any reasonable degree of resolution, short wavelengths are necessary. Unfortunately, such short wavelengths suffer from very high attenuation. Long wavelengths do not provide adequate resolution. For these reasons, seismic techniques are preferred.

However, while longer wavelengths applied by electromagnetic techniques cannot provide sufficient information to provide an accurate indication of the boundaries of the various strata, if the geological structure is already known, they can be used to determine the nature of a particular identified formation, if the possibilities for the nature of that formation have significantly differing electromagnetic characteristics. The resolution is not particularly important and so longer wavelengths which do not suffer from excessive attenuation can be employed.

The resistivity of seawater is about 0.3 ohm-m and that of the overburden beneath the seabed would typically be from 0.3 to 4 ohm-m, for example about 2 ohm-m. However, the resistivity of a hydrocarbon reservoir is likely to be about 20–300 ohm-m. Typically, therefore, the resistivity of a hydrocarbon-bearing formation will be 20 to 300 times greater than that of a water-bearing formation. This large difference can be exploited using the techniques of the present invention.

The electrical resistivity of a hydrocarbon reservoir normally is far higher than the surrounding material (overburden). EM-waves attenuate more rapidly, and travel slower inside a low resistivity medium, compared to a high resistivity medium. Consequently, hydrocarbon reservoir will attenuate EM-waves less, compared to a lower resistivity overburden. Furthermore, the EM-wave speed will be higher inside the reservoir.

Thus, an electric dipole transmitter antenna on or close to the sea floor induces electromagnetic EM fields and currents in the sea water and in the subsurface strata. In the sea water, the EM-fields are strongly attenuated due to the high conductivity in the saline environment, whereas the subsurface strata with less conductivity causes less attenuation. If the frequency is low enough (in the order of 1 Hz), the EM energy is able to penetrate deep into the subsurface, and deeply buried geological layers having higher electrical resistivity than the overburden (as e.g. a hydrocarbon filled reservoir) will affect the EM-waves. Depending on the angle of incidence and state of polarisation, an EM wave incident upon a high resistive layer may excite a ducted (guided) wave mode in the layer. The ducted mode is propagated laterally along the layer and leaks energy back to the overburden and receivers positioned on the sea floor. In the present application, such a wave mode is referred to as a "refracted wave".

The distance between the EM source and a receiver is referred to as the offset. Due to the fact that a refracted wave in a hydrocarbon-bearing formation will be less attenuated than a direct wave in seawater (or in the overburden), for any given H/C bearing formation, there will be a critical offset at which the refracted wave and the direct wave will have the same signal strength. This may typically be about two to three times greater than the shortest distance from the source (or receiver) to the H/C bearing formation. Thus, when the offset is greater than the critical offset, the radial EM waves that are refracted into, and guided through the reservoir, will pay a major contribution to the received signal. The receiver signal will be of greater magnitude and arrive earlier (i.e. have smaller phase) compared to the case where there is no HC reservoir. In many cases, the phase change and/or magnitude change recorded at distances greater than the critical offset, may be directly used for calculation of the reservoir resistivity. Furthermore, the reservoir depth may be inferred from the critical offset and/or the phase and magnitude slopes for various source—receiver offsets.

The present invention has arisen from this realisation.

According to one aspect of the present invention, there is provided, a method of investigating subterranean strata which comprises: deploying an electric dipole transmitter antenna; deploying an electric dipole receiver antenna at a predetermined offset distance from the transmitter; applying an electromagnetic (EM) field to the strata using the transmitter; detecting the EM wave field response using the receiver, extracting phase information from the wave response; repeating the procedure with the transmitter and/or receiver in different locations for a plurality of transmissions; and using the phase information from the wave response for the plurality of transmissions, in order to determine the presence and/or nature of the reservoir.

Thus, the offset can be varied by moving the receiver; or indeed the transmitter, or even both. Alternatively, the predetermined offset can be kept constant by moving both the transmitter and receiver.

Thus, the horizontal boundaries of the reservoir may be found by analysing the slope and/or slope change of the curve(s) of phase and/or magnitude as a function of source-receiver offset distance or position, or by analysing the variation in phase and/or magnitude for a fixed source-receiver offset at several locations. The most useful source-receiver offset is typically larger than the "critical offset". In this part of the curve, the change in slope, may indicate the reservoir boundary.

Both the source and the receiver are preferably inside the reservoir area to achieve the smallest slope (or gradient). This is true for both the phase and the magnitude curves. Soon after either the source or the receiver leaves the reservoir area, the slopes increases rapidly. From the position where this change occurs, the reservoir boundary may be mapped. The true reservoir boundary will probably lie closer the centre of the reservoir compared to the location where the slope change occurred, typically 10 to 20% of the reservoir depth. The detailed position may be calculated using the measured data and forward modelling.

This technique of the invention can be used in conjunction with conventional seismic techniques to identify hydrocarbon reservoirs.

If the offset between the transmitter and receiver is significantly greater than three times the depth of the reservoir from the seabed (i.e. the thickness of the overburden), it will be appreciated that the attenuation of the refracted wave will often be less than that of direct wave and the reflected wave. The reason for this is the fact that the path of the refracted wave will be effectively distance from the transmitter down to the reservoir i.e. the thickness of the overburden, plus the offset along the reservoir, plus the distance from the reservoir up to the receivers i.e. once again the thickness of the overburden.

If no H/C reservoir is present in the area of the transmitter and receiver, the phase of the detected wave response will consist of a direct wave and will therefore change linearly with a changing offset. Similarly, the phase of the detected wave response will remain constant at a constant offset in different locations.

However, if an H/C reservoir is present, there will be a refracted wave component in the wave response and this may predominate. Due to the higher phase velocity (wavespeed) in H/C filled strata, this will have an effect on the phase of the received wave response. In the case of an increasing offset, the phase will not change linearly; a plot of phase against offset will be a curve with a constantly changing slope. Thus, a change from a straight line to a curve, or vice versa, will indicate the boundary of an H/C reservoir.

In the case of a constant offset, the presence of an H/C reservoir will give rise to a constant but different phase value at different locations compared to the situation where no H/C reservoir is present. Thus, a change in phase value will indicate the boundary of an H/C reservoir.

Preferably, the procedure is repeated at different offsets.

In one embodiment, the method includes plotting a graph of the phase of the refracted wave response from a particular stratum against offset and analysing the slope of the graph in order to determine the nature of the stratum. Alternatively, the method includes plotting a graph of the phase of the reflected wave response from a particular stratum and identifying a change in the slope of the graph.

In another embodiment, the method comprises repeating the procedure at different locations, using the same predetermined offset, and analysing the phase of the refracted wave response from a particular stratum in order to identify a change in the phase value.

The polarization of the source transmission will determine how much energy is transmitted into the oil-bearing layer in the direction of the receiver. A dipole antenna is therefore the selected transmitter. In general, it is preferable to adopt a dipole with a large effective length. The transmitter dipole may therefore be 100 to 1000 meters in length and may be towed in two orthogonal directions. The receiver dipole optimum length is determined by the thickness of the overburden.

The technique can be applicable in exploring land-based subterranean reservoirs but is especially applicable to submarine, in particular sub-sea, subterranean reservoirs. Preferably the field is applied using one or more transmitters located on the earth's surface, and the detection is carried out by one or more receivers located on the earth's surface. In a preferred application, the transmitter(s) and/or receivers are located on or close to the seabed or the bed of some other area of water.

The transmitted field may be pulsed, however, a coherent continuous wave optionally with stepped frequencies is preferred. It may be transmitted for a significant period of time, during which the transmitter should preferably be stationary (although it could be moving slowly), and the transmission stable. Thus, the field may be transmitted for a period of time from 3 seconds to 60 minutes, preferably from 10 seconds to 5 minutes, for example about 1 minute. The receivers may also be arranged to detect a direct wave as well as the refracted wave from the reservoir, and the analysis may include extracting phase and amplitude data of the refracted wave from corresponding data from the direct wave.

Preferably, the wavelength of the transmission should be in the range $$0.1s \leq \lambda \leq 5s;$$

where $\lambda$ is the wavelength of the transmission through the overburden and s is the distance from the seabed to the reservoir. More preferably $\lambda$ is from about 0.5 s to 2 s. The transmission frequency may be from 0.01 Hz to 1 kHz, preferably from 0.1 to 20 Hz, for example 1 Hz.

Preferably, the distance between the transmitter and a receiver should be in the range $$0.5\lambda \leq L \leq 10\lambda;$$

where $\lambda$ is the wavelength of the transmission through the overburden and L is the distance between the transmitter and the first receiver.

It will be appreciated that the present invention may be used to determine the position, the extent, the nature and the volume of a particular stratum, and may also be used to detect changes in these parameters over a period of time.

The present invention also extends to a method of surveying subterranean measures which comprises; performing a seismic survey to determine the geological structure of a region; and where that survey reveals the presence of a subterranean reservoir, subsequently performing a method as described above.

The invention may be carried into practice in various ways and will now be illustrated in the following simulated Examples.

DETAILED DESCRIPTION OF THE DRAWINGS

In FIGS. 1 to 4, it is assumed that the sea 11 has a resistivity of 0.3 ohm-m and a depth of 1000 m from the surface 12 to the seabed 13. The overburden 14 has a resistivity of 0.7 ohm-m. The transmitted wave had a frequency of 1 Hz.

Figure 1:
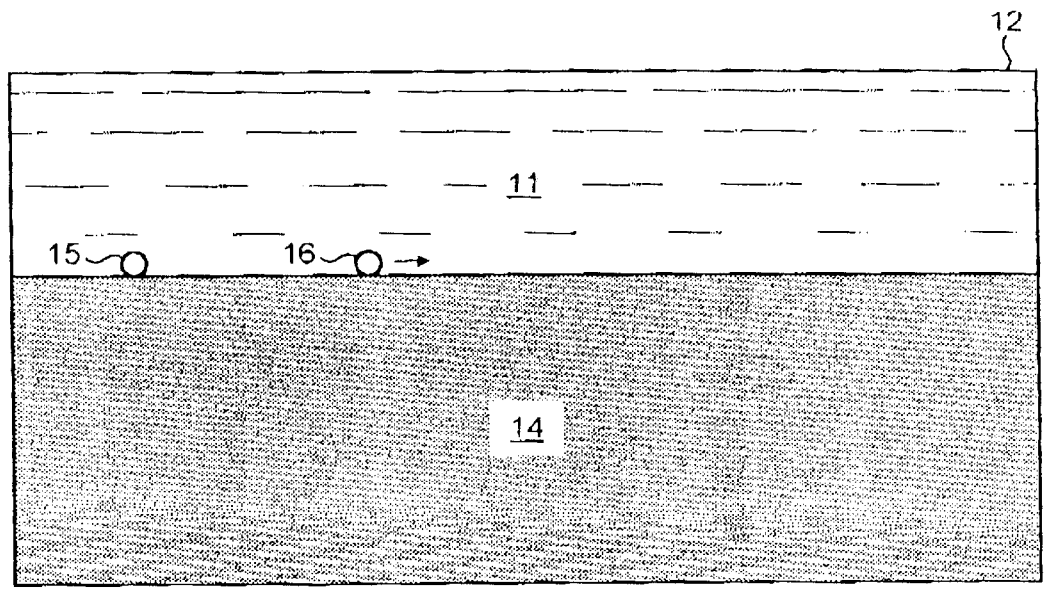
FIG. 1 is a schematic representation of a situation in which measurements are taken outside the area of a reservoir.

FIG. 1 shows the situation where a receiver 15 and a transmitter 16 are located on the seabed 13 in a region where there is no subterranean reservoir. The position of the receiver 15 is fixed. The transmitter 16 is moved to various different positions resulting in different offsets from the receiver 15. At each position of the transmitter 16, an EM field is transmitted and the wave field response is detected by the receiver 15. The wave field response includes a direct wave component and reflected wave components. Phase information is extracted for each response and the results are plotted as a graph in FIG. 5. The plot of phase against offset (source-receiver distance) is a straight line 51, showing that the phase varies linearly with offset.

Figure 2:
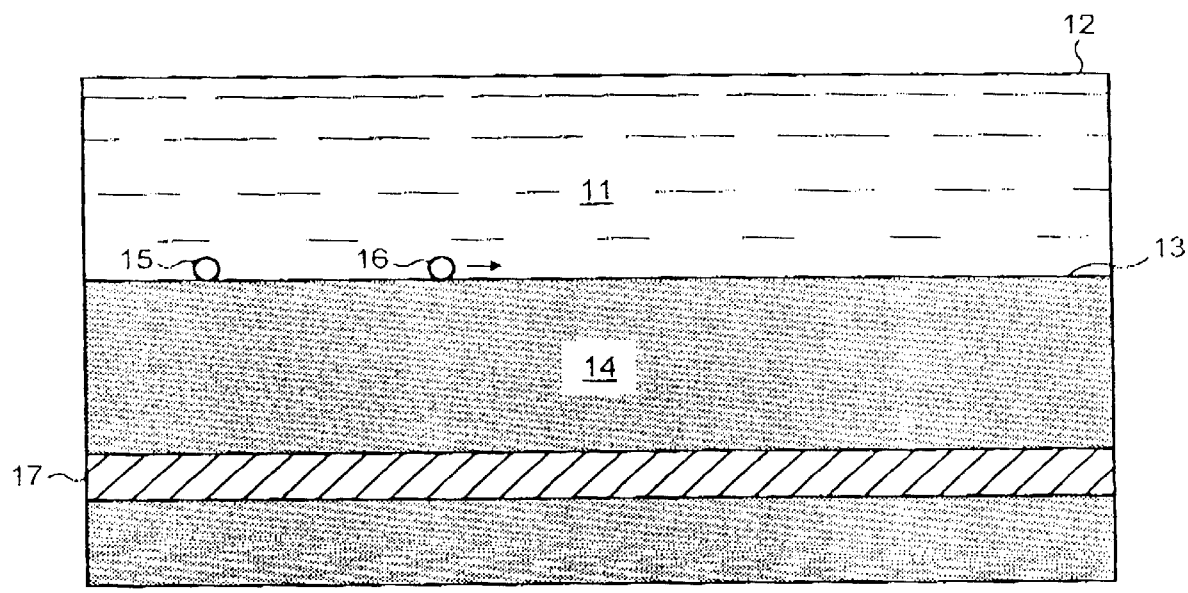
FIG. 2 is a schematic representation of a situation in which measurements are taken inside the area of a HC reservoir.
Figure 5:
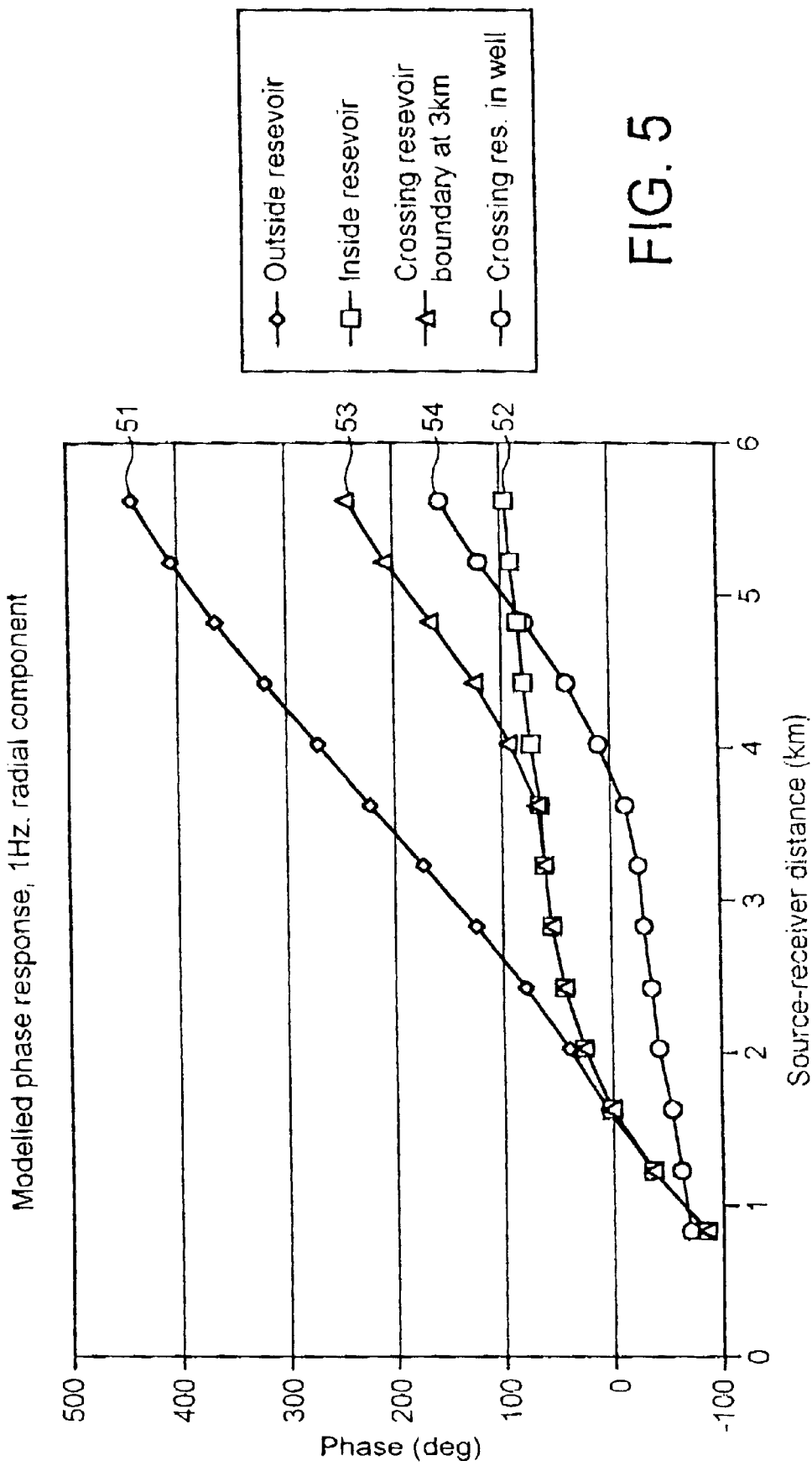
FIG. 5 is a graphical representation of the results from the situations in FIGS. 1 to 4.

FIG. 2 shows the situation where the transmitter 15 and receiver 16 are deployed in a region where there is a subterranean H/C reservoir 17. The reservoir 17 is 100 m thick and has a resistivity of 50 ohm-m, and is located at a depth of 800 m beneath the seabed 13. The procedure described in relation to FIG. 1 is repeated and again the results are shown in FIG. 5.

In this case, the wave field response additionally includes a refracted wave component from the reservoir 17. This affects the phase of the response and results in the plot of phase against offset taking the form of a smooth curve 52, with a constant change of slope.

Figure 3:
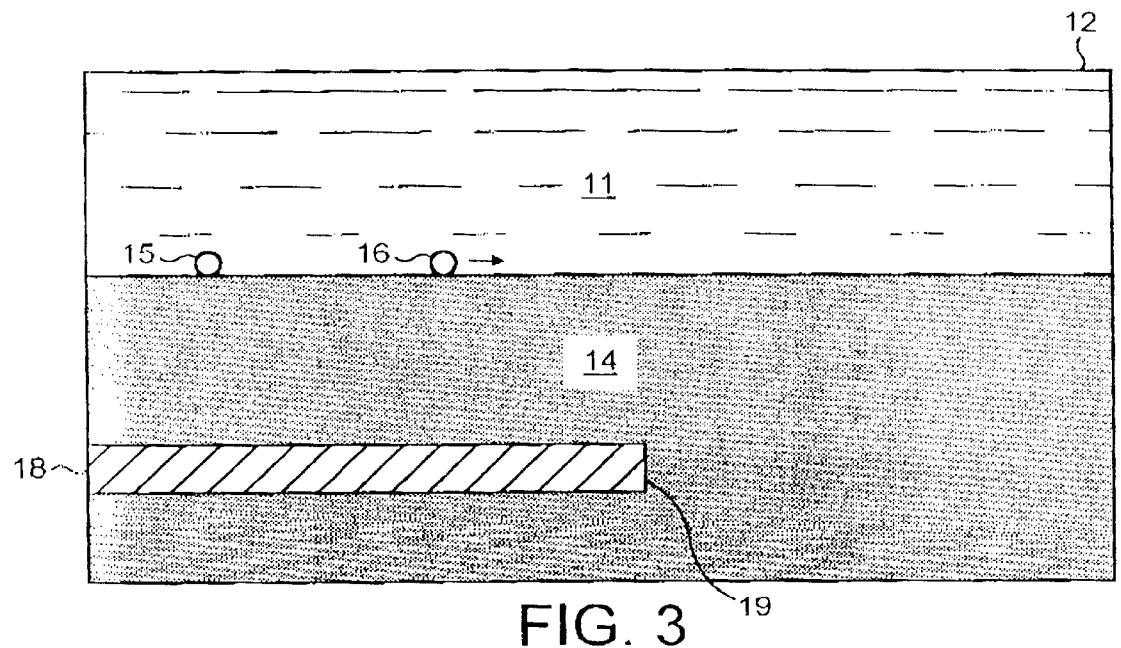
FIG. 3 is a schematic representation of a situation in which measurements are taken crossing a H/C reservoir boundary.

FIG. 3 shows the situation where the transmitter 15 and receiver 16 are deployed in a region where there is an H/C reservoir 18 with a boundary 19. The reservoir 18 is similar to that in FIG. 2 but its boundary 19 is at a position 3 km away from the position of the transmitter 15. Again, the procedure described in relation to FIG. 1 is repeated and the results are shown in FIG. 5.

In this case, the wave field response phase curve 53 initially follows the curve 52 of the results from FIG. 2 but soon after an offset of 3 km, the results follow a straight line which has the same slope as the line 51 of the FIG. 1 situation. The change in slope of the curve 52 clearly shows the presence of a boundary between an H/C reservoir and no H/C reservoir. The position of the boundary 19 can be deduced from the position of the change in slope.

Figure 4:
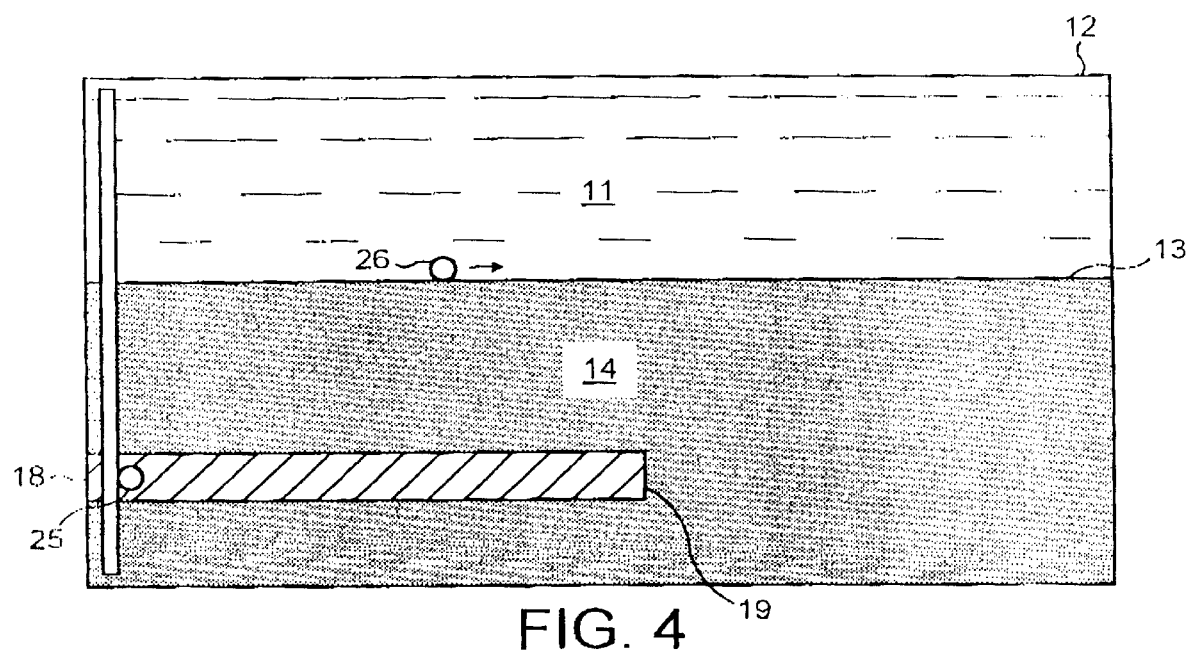
FIG. 4 is a view similar to FIG. 3, in which the receiver is in a borehole.

The situation shown in FIG. 4 is similar to that of FIG. 3 except that in this case, the receiver 25 is located in a well bore 27 and the transmitter 26 is moved to different locations to vary the offset. Once again, the procedure described in relation to FIG. 1 was repeated and the results are shown in FIG. 5.

Due to the location of the receiver 25 in a well bore 27 and within the reservoir 18, the phase curve 54, as the offset increases, follows a straight line initially. The slope of the initial portion is shallower than the slope of the curve 51 where no H/C reservoir was present, due to the effect of the presence of a direct wave propagated through the H/C reservoir. However, soon after an offset of 3 km, the slope of the curve 54 begins to change and continues to change until it attains the same slope as the curve 51 of FIG. 1. This change again shows clearly the presence of an H/C reservoir boundary and its position can be deduced from the position of the change in the slope of the curve 54.

What is claimed is:

1. A method of investigating subterranean strata which comprises:
  (a) deploying an electric dipole transmitter antenna;
  (b) deploying an electric dipole receiver antenna at a predetermined offset distance from the transmitter;
  (c) applying an electromagnetic (EM) field to the strata using the transmitter;

(d) detecting the EM wave field response using the receiver;

(e) extracting phase information from the wave response;

(f) repeating the procedure with the transmitter and/or receiver in different locations for a plurality of transmissions; and (g) using the phase information from the wave response for the plurality of transmissions, in order to determine the presence and/or nature of the reservoir in which the transmission frequency is from 0.01 Hz to 1 kHz by analyzing the detected wave field for the presence of a refracted wave component.

2. A method as claimed in claim 1, in which the procedure is repeated at different offsets.

3. A method as claimed in claim 2, which includes plotting a graph of the phase of a refracted wave response from a particular stratum against offset and analysing the slope of the graph in order to determine the nature of the stratum.

4. A method as claimed in claim 2, which includes plotting a graph of the phase of the reflected wave response from a particular stratum and identifying a change in the slope of the graph.

5. The method of claim 2 wherein the different offsets are greater than a critical offset.

6. The method of claim 5 wherein the different offsets are at least three times greater than a thickness of the overburden for the reservoir.

7. A method as claimed in claim 1, which comprises repeating the procedure at different locations, using the same predetermined offset, and analysing the phase of a refracted wave response from a particular stratum in order to identify a change in the phase value.

8. A method as claimed in claim 1, which additionally includes extracting and using amplitude information from the wave response.

9. A method as claimed in claim 8, in which the amplitude information is extracted from a refracted wave response.

10. A method as claimed in claim 1, in which the transmitter and/or receiver is located on or close to the seabed or the bed of some other area of water.

11. A method as claimed in claim 10, in which the transmission time is from 10 seconds to 5 minutes.

12. A method as claimed in claim 1, in which the frequency of the EM field is continuously varied over the transmission period.

13. A method as claimed in claim 1, in which the field is transmitted for a period of time for 3 seconds to 60 minutes.

14. A method as claimed in claim 1, in which the wavelength of the transmission is given by the formula $$0.1s \leq \lambda \leq 10s;$$

wherein $\lambda$ is the wavelength of the transmission through the overburden and s is the distance from the seabed to the reservoir.

15. A method as claimed in claim 1, in which the predetermined offset between the transmitter and a receiver is given by the formula:

$$0.5\lambda \leq L \leq 10\lambda;$$

where $\lambda$ is the wavelength of the transmission through the overburden and L is the distance between the transmitter and the receiver.

16. A method as claimed in claim 1, in which the transmission frequency is from 0.1 to 20 Hz.

17. A method as claimed in claim 1, which includes suppressing the direct wave and/or any other known wave contribution that may disturb the measurements, thereby reducing the required dynamic range of the receiver and increasing the resolution of a refracted wave.

18. A method as claimed in claim 1 for use in the survey of subterranean strata including the step of first performing a seismic survey to determine the geological structure of a region and, where that survey reveals the presence of a subterranean reservoir, performing steps a–g.

19. The method of claim 14 further comprising providing a member of the group consisting of the receiver, the transmitter, the receiver antenna, the transmitter antenna, and a combination thereof.

20. The method of claim 14 further comprising equipping a vessel with a member of the group consisting of the receiver, the transmitter, the receiver antenna, the transmitter antenna, and a combination thereof.

21. A method of investigating subterranean strata which comprises:

(a) deploying an electric dipole transmitter antenna;

(b) deploying an electric dipole receiver antenna at a predetermined offset distance from the transmitter;

(c) applying an electromagnetic (EM) field to the strata using the transmitter;

(d) detecting refracted waves in the EM wave field response using the receiver;

(e) extracting phase information from the refracted waves in the wave response;

(f) repeating the procedure with the transmitter anchor receiver in different locations for a plurality of transmissions; and (g) using the refracted wave phase information from the wave response for the plurality of transmissions for an analysis to determine the presence and/or nature of the reservoir.

22. A method as claimed in claim 21, in which the procedure is repeated at different offsets, and which includes plotting a graph of the phase of the refracted wave response from a particular stratum against offset and analyzing the slope of the graph in order to determine the nature of the stratum.

23. A method as claimed in claim 21, which comprises repeating the procedure at different locations, using the same predetermined offset, and analyzing the phase of the refracted wave response from a particular stratum in order to identify a change in the phase value.

24. A method as claimed in claim 21, which additionally includes extracting and using amplitude information from the wave response, and in which the amplitude information is extracted from the refracted wave response.

25. A method as claimed in claim 21, which includes suppressing the direct wave and/or any other known wave contribution that may disturb the measurements, thereby reducing the required dynamic range of the receiver and increasing the resolution of the refracted wave.

26. The method of claim 21 in which the procedure is repeated at different offsets, wherein the different offsets are greater than a critical offset.

27. The method of claim 21 in which the procedure is repeated at different offsets, and the different offsets are at least three times greater than a thickness of the overburden for the reservoir.

28. The method of claim 21 further comprising providing a member of the group consisting of the receiver, the transmitter, the receiver antenna, the transmitter antenna, and a combination thereof.

29. The method of claim 21 further comprising equipping a vessel with a member of the group consisting of the receiver, the transmitter, the receiver antenna, the transmitter antenna, and a combination thereof.

* * * * *

UNITED STATES PATENT AND TRADEMARK OFFICE
CERTIFICATE OF CORRECTION

PATENT NO. : 6,717,411 B2
DATED : April 6, 2004
INVENTOR(S) : Ellingsrud et al.

It is certified that error appears in the above-identified patent and that said Letters Patent is hereby corrected as shown below:

<u>Title page,</u>
Insert Item:
-- [30] Foreign Application Priority Data
      August 7, 2001 (GB)     0119245.9 --

Signed and Sealed this

Twenty-second Day of March, 2005

JON W. DUDAS
*Director of the United States Patent and Trademark Office*